US005576486A

United States Patent [19]
Paz

[11] Patent Number: 5,576,486
[45] Date of Patent: Nov. 19, 1996

[54] ELECTRONIC FLOWMETER SYSTEM WITH A STOPPER AGAINST UNDESIRABLE FLOWS, LEAK DETECTOR AND BYPASS FOR MEASURING LOW FLOWS

[75] Inventor: Ilan Paz, Gush Etzion, Israel

[73] Assignee: S.F.M. Sophisticated Water Meters Ltd., Arba, Israel

[21] Appl. No.: 353,250

[22] Filed: Dec. 2, 1994

[30] Foreign Application Priority Data

Dec. 2, 1993 [IL] Israel ......................................... 107848

[51] Int. Cl.⁶ ............................................. G01F 7/00
[52] U.S. Cl. ............................................. 73/197; 137/519.5
[58] Field of Search ............................ 73/197; 137/519.5, 137/599.1

[56] References Cited

U.S. PATENT DOCUMENTS

| | | | |
|---|---|---|---|
| 2,390,749 | 12/1945 | Swift | 137/519.5 |
| 3,555,901 | 1/1971 | Delatorre et al. | 73/197 |
| 3,677,084 | 7/1972 | Masson et al. | 73/197 |
| 4,100,799 | 7/1978 | Bradham, III et al. | 73/197 |
| 4,175,434 | 11/1979 | Bradham, III et al. | 73/197 |
| 4,257,448 | 3/1981 | Shiu et al. | 137/519.5 |
| 4,429,571 | 2/1984 | Kullmann et al. | 73/197 |
| 4,885,943 | 12/1989 | Tootell et al. | 73/861.77 |
| 5,117,856 | 6/1992 | Kim et al. | 73/197 |

Primary Examiner—Richard Chilcot
Assistant Examiner—Harshad Patel
Attorney, Agent, or Firm—Lowe, Price, LeBlanc & Becker

[57] ABSTRACT

An electronic liquid flow measuring system has a power source, a main electronic flow meter and a secondary liquid low flow electronic meter connected to bypass the main meter. A microprocessor controls flow measurements and a three-position valve is connected to both meters for closing the main flow meter at very low flows to permit only the secondary liquid flowmeter to operate at such low flows. At normal flows, the valve is in a position to allow liquid to flow through both meters and when liquid flow exceeds a predetermined flow rate, the valve blocks all flow.

12 Claims, 7 Drawing Sheets

ELECTRONIC FLOWMETER SYSTEM WITH A STOPPER AGAINST UNDESIRABLE FLOWS, LEAK DETECTOR AND BYPASS FOR MEASURING LOW FLOWS

FIELD OF THE INVENTION

The present invention relates to an electronic flowmeter comprising of a high (large) flow detector and a low (small) flow detector. Each detector has a magnetic or other pick-up sensor and microprocessor to automatically detect and stop undesirable excessive flows beyond a predetermined consumption graph. The flowmeter is designed to detect very low continuous flows (fluid leak). This flowmeter saves valuable fluids and energy required to pump the fluids. This flowmeter is self diagnostic.

BACKGROUND OF THE INVENTION

Fluid flow meters are well known as, for example in U.S. Pat. No. 3,677,084. This patent relates to two fluid meters, a high flow meter and a low flow meter which provides improved accuracy characteristics compared to older types of meters. The meter is designed for easy manufacturing, is less expensive, lightweight and allows for easy service. This flow meter does not help to automatically detect and stop undesirable excessive flows beyond a predetermined consumption graph nor to detect, memorize, register and alert when a continuous slow flow exists (flow leak). This meter is fully mechanical and does not have a microprocessor.

U.S. Pat. No. 4,100,799 illustrates a flow meter which provides a fluid meter which has more precise measuring capability due to the implementation of a small meter and a large one utilizing a by-pass between the two meters. The disadvantage of this flow meter is that it does not help to automatically detect and stop undesirable excessive flow beyond a predetermined consumption graph nor to detect, memorize, register and alert when a continuous slow flow exist (fluid leak). This meter is fully mechanical and does not have a microprocessor.

U.S. Pat. No. 4,175,434 describes an extension of the previous patent and relates to the same fluid meter but which has more precise measuring capability. This flowmeter consists of a pair of meters wherein the measurements obtained are constantly integrated. This arrangement enables the readings obtained from the assembly to be readily interpreted. This flowmeter facilitates easy maintenance and calibration. The disadvantage of this flow meter is that it does not help to automatically detect and stop undesirable excessive flow beyond a predetermined consumption nor to detect, memorize, register and alert when a continuous slow flow exist (flow leak). This meter is fully mechanical and does not have a microprocessor.

U.S. Pat. No. 4,885,943 describes an electronic flowmeter. Flow measurements are made by digitally measuring the time periods between successive input pulses generated by detecting the rotation of a turbine. A microprocessor compensates for nonlinear rotation rate and the actual flow rates by applying correction method at slow flows. This is a flow measuring system which is not contained in a compact flow meter device. This flow meter system does not contain two flow meters for high and low flows rates nor does it help to automatically detect, memorize, register and alert when a continuous slow flow exists (fluid leak).

Turbine flowmeters have long been used to measure fluid flow by means of a turbine immersed in the fluid. A magnet connected to the turbine turns a second magnet which is placed in a dry area. The second magnet derives a cog system that turns a mechanical counter. These flow meters are the conventional magnetic flow meters in general use today. These flowmeters are unable to detect low flows due to internal friction and inherent inaccuracies due to their internal structure, the known flowmeters are not able to stop undesirable predetermined fluid flows such as a sudden burst pipe or when a flow is beyond a predetermined time. Nor can said flowmeter detect and register a leak or differentiate between a slow flow that is a constant leak of fluid or a desirable slow flow in the systems.

BRIEF DESCRIPTION OF THE INVENTION

The present invention relates to an electronic liquid flow-measuring system comprising of a power source; a main electronic flow meter and a secondary liquid low flow electronic meter connected as a by-pass to said main meter; a microprocessor for controlling flow measurements and the three position valve; a three position valve connected to both meters for closing said electronic main flowmeter at very low flows permitting only said secondary liquid flow meter to operate at low flows, such that a normal flows the valve is in its second position allowing the liquid to flow through both meters, and when the liquid flow is beyond a predetermined flow the valve is in its third position blocking all flow, and wherein said third position is achieved by means for opening a gate that permits the moving part of the valve to reach its third position and digital and analog processing means for producing readable numeric output values.

The present invention improves the monitoring of total fluid flow and stops undesirable high flow. This meter also detects very low flows. The two meters are arranged such that a high flow meter (the main electronic flow meter) is positioned in the main stream and a low flow meter is located in a small diameter by-pass pipe. Each meter has a separate electronic counter. The flow detected by the flowmeters are summed by means of the microprocessor. The microprocessor automatically detects, memorizes, registers and alerts when a continuous low flow exists (fluid leak). The microprocessor also automatically detects undesirable excessive flow beyond a predetermined consumption graph and activates the solenoid-operated latch mechanism to allow a ball valve to close which stops all fluid flow.

DETAILED DESCRIPTION OF THIS INVENTION

The present invention improves the monitoring of total fluid flow and stops undesirable high flows. This meter also detects very low flows.

The flowmeter construction is one major assembly connected in series with the tubing or pipes carrying the fluid. The mechanical structure is divided into two separate areas: the wet zone and the dry zone. The housing of the meter could be made with cast metal or other materials such as composite material or thermoplastic material or any other suitable material (depending on the type of fluid, temperature and pressure). The shape of the housing is streamlined in the direction of the fluid-flow. The wet zone includes the housing of the high flow meter, the low flow meter and the shut-off ball valve mechanisms. Meter parts are arranged such that the high flow meter is in the main stream and the low flow is located in a small diameter by-pass pipe.

When the flow is low the ball valve is closed and the large meter does not operate; the fluid is directed through the by-pass and the low flow meter records the fluid flow. Each meter has a separate electronic counter. The flows detected by the flowmeters are summed by means of the microprocessor. In the transient mode (i.e. when there is a transition between a low and high flow), and the high flow mode both meters operate, and the individual flow as well as the total flow is accounted for in the microprocessor.

The microprocessor, the transducer system, the energy source, and the display will be in the dry zone of the flowmeter housing. The dry zone and the wet zone are separated and sealed to avoid fluid penetration from the wet zone to the dry zone. Both meters generate a moving magnetic field or other electromagnetic or optical phenomenon that may be picked up through the material that separates the two zones, without mechanical connection.

The following description will illustrate the function of the ball valve mechanism. A large ball is installed in the vertical or oblique or other ball valve chamber, which has three positions:

1) In the low flow mode, the ball is seated on a cone type lower seal and by gravity and/or magnetic force the flow through the main conduit is closed forcing the entire flow through the small conduit and the low flowmeter.

2) When the flow is in its high range, the ball is lifted from the lower seal by the pressure of the fluid stream, keeping the valve in the "normal open position". This will allow the fluid to flow around the ball and up through the open valve. The ball's motion is limited by a solenoid operated latch mechanism. The mechanism does not allow the ball from closing the upper orifice of the ball valve. In this mode the fluid flow is within the predetermined allowable range.

3) When the flow is in the abnormal high range, the ball is lifted by the pressure of the fluid stream to the upper orifice seal blocking all flow through the flowmeter.

The microprocessor automatically detects undesirable excessive flow beyond a predetermined consumption graph, and actuates the solenoid-operated latch mechanism, to allow the fluid flow to force the ball valve to close the upper orifice of the ball valve chamber, blocking all flow. Both the small and the large conduits will be closed in this position. The latch mechanism comprises: (i) piston that is actuated by the solenoid armature and moves linearly, (ii) a latch that restrains the upward motion of the ball.

The microprocessor will control the following functions:
1) Flow measurements.
2) Control over the ball valve.

Since the measurements of the fluid are electronically performed on each meter, the input information from each meter is directed to the input of the microprocessor. This will facilitate a number of innovations:

a) Continuous information (metering) of the fluid flow at all times. This information can be presented on a liquid crystal or any other display on the device or can be transmitted to a remote location as desired.

b) The continuous control of fluid flow at all times is registered by the microprocessor. The microprocessor can automatically command the solenoid to be actuated which stops the fluid flow when the flow is beyond a preprogrammed consumption plan, or the solenoid can be activated manually.

c) Flow can be stopped when accounts not paid.

d) Charges can be weighted according to the time of day used.

e) Fines can be imposed for a leaky wasteful system.

f) By comparing the ratio of the flows in both the large flowmeter and the low flowmeter it can be determined whether the flowmeter is operating correctly.

DETAILED DESCRIPTION OF THE DRAWINGS

Figure 1:
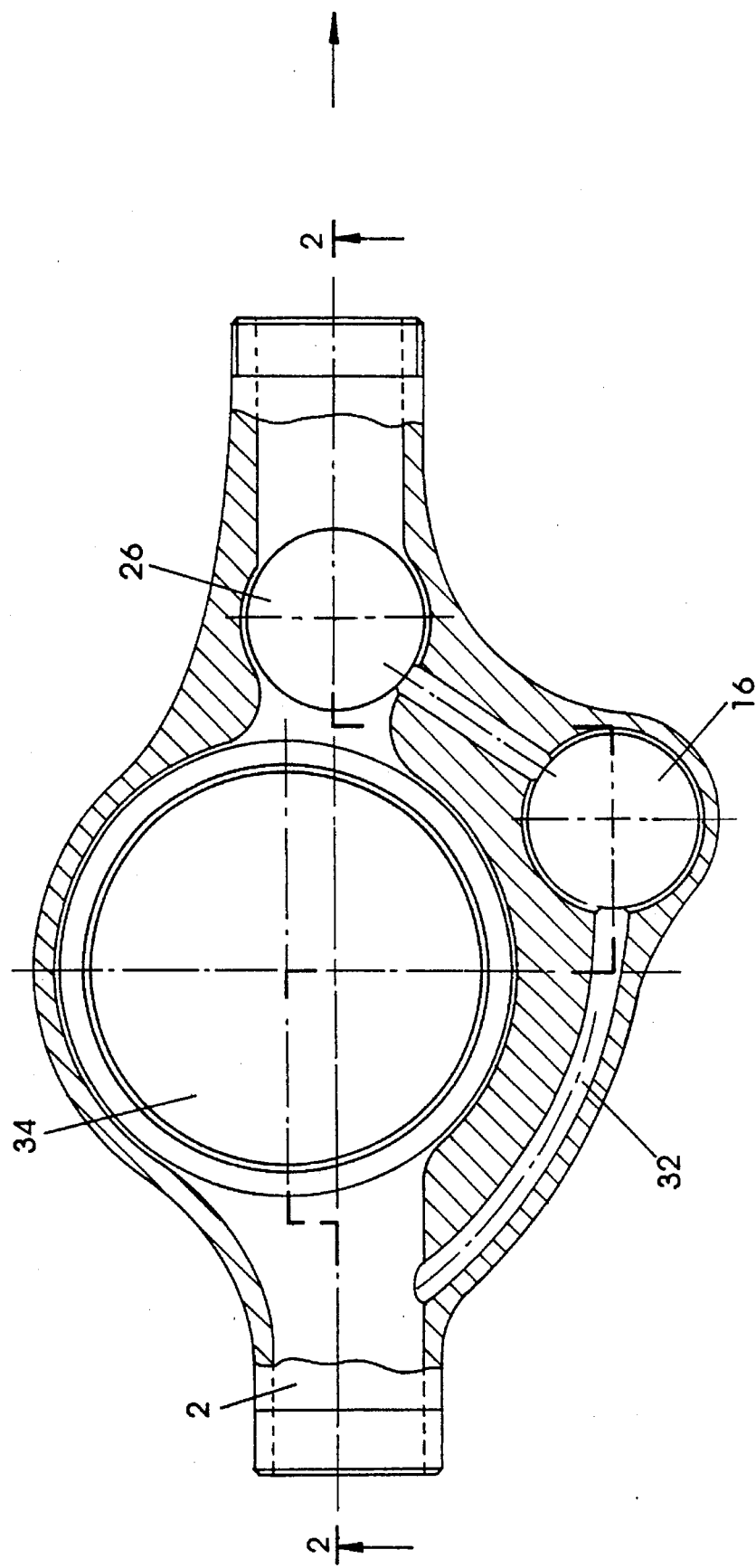
FIG. 1 shows the upper cross-sectional view of the flowmeter.

FIG. 1 illustrates the upper cross-sectional view of the wet zone. This shows the flowmeter construction in one major assembly constitute of:

The housing of the high flowmeter (34)

The housing of the low flowmeter (16)

The ball valve chamber (26)

The main fluid flow path (2) and the by-pass duct (32).

The high flow meter (34) and the ball valve chamber (26) are connected in series by the main flow path tubing (2).

The low flowmeter (16) is connected in parallel with the high flowmeter (34) by the flow duct (32). The low flow duct (32) enters the ball valve chamber (26).

Figure 2:
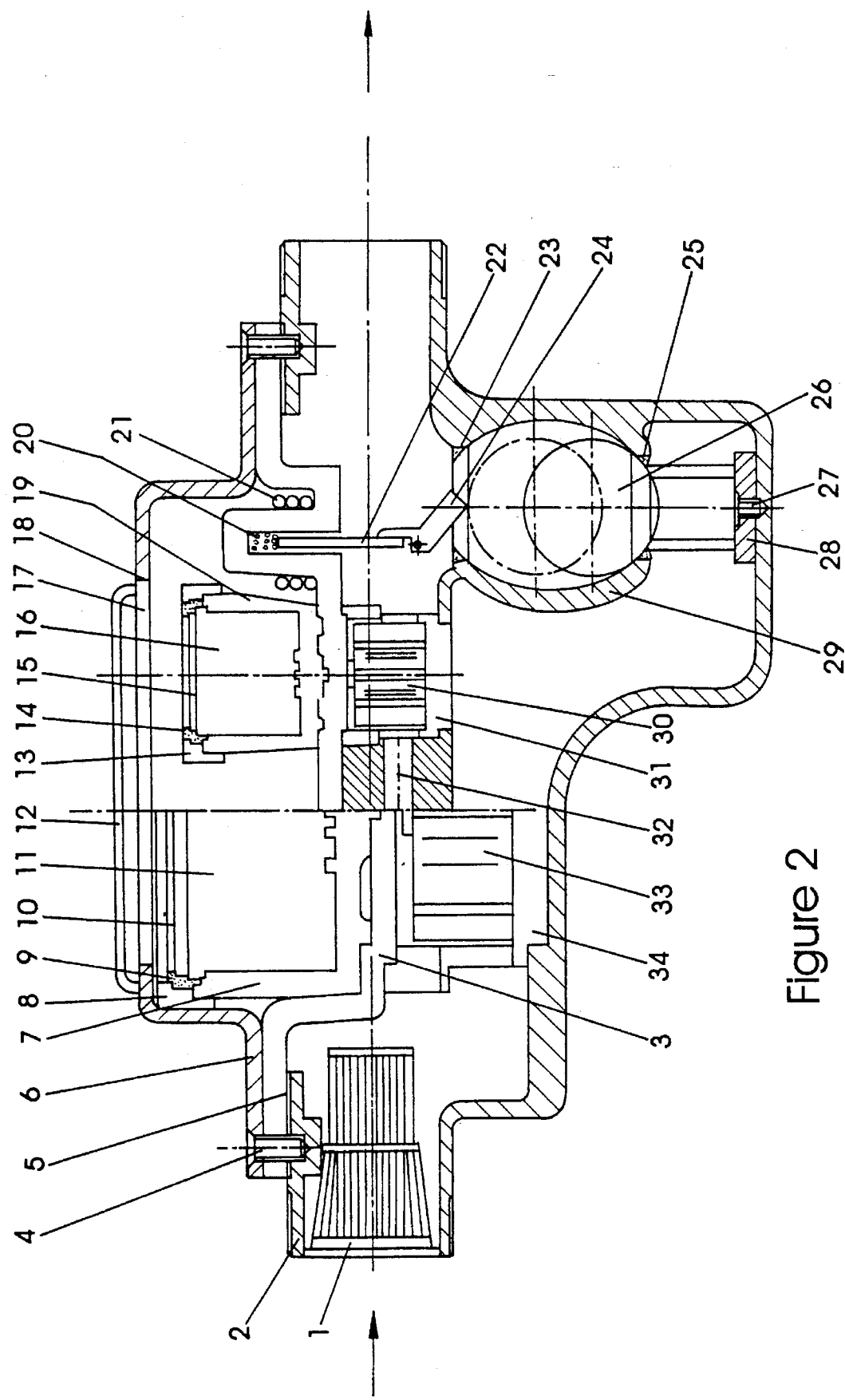
FIG. 2 illustrates the side cross-sectional view along the section line shown in FIG. 1.

FIG. 2 illustrates the side cross-sectional view along the section line shown in FIG. 1. The meter parts shown in FIG. 2 include: the body of the flow meter (6), the division between the wet and dry zone (3), the dry area (7) in which the electronics is situated, including the microprocessor and transducers.

The high flow detector (33) and the low flow detector (30), the solenoid (21) operated ball valve (26) which is seated on the lower seal (25).

The magnet (28) which locks the ball (26) on the lower seal (25).

The mechanical structure is divided into two separate areas by the means of rigid part (3) to the wet lower zone (34) and the dry upper zone (7).

The wet zone includes the housing of the high flow meter (33) part, the low flow meter parts (30) and the shut-off valve mechanisms (20)–(29). In said shut-off valve housing (29) there is a magnet connected to housing mechanism by a screw (27) which pulls the valve ball (26) against a seal (25). In said position the flow through the main conduit is closed forcing the entire flow through a small conduit (32) and the low flowmeter (30). The flowmeter detecting system (16) and the high flowmeter detecting system (11) are wired to the microprocessor. When the flow is low the ball valve (26) is closed and the large meter (33) does not operate; the fluid is directed to the by-pass (32) and the low flow meter (30) records the fluid flow.

Figure 3:
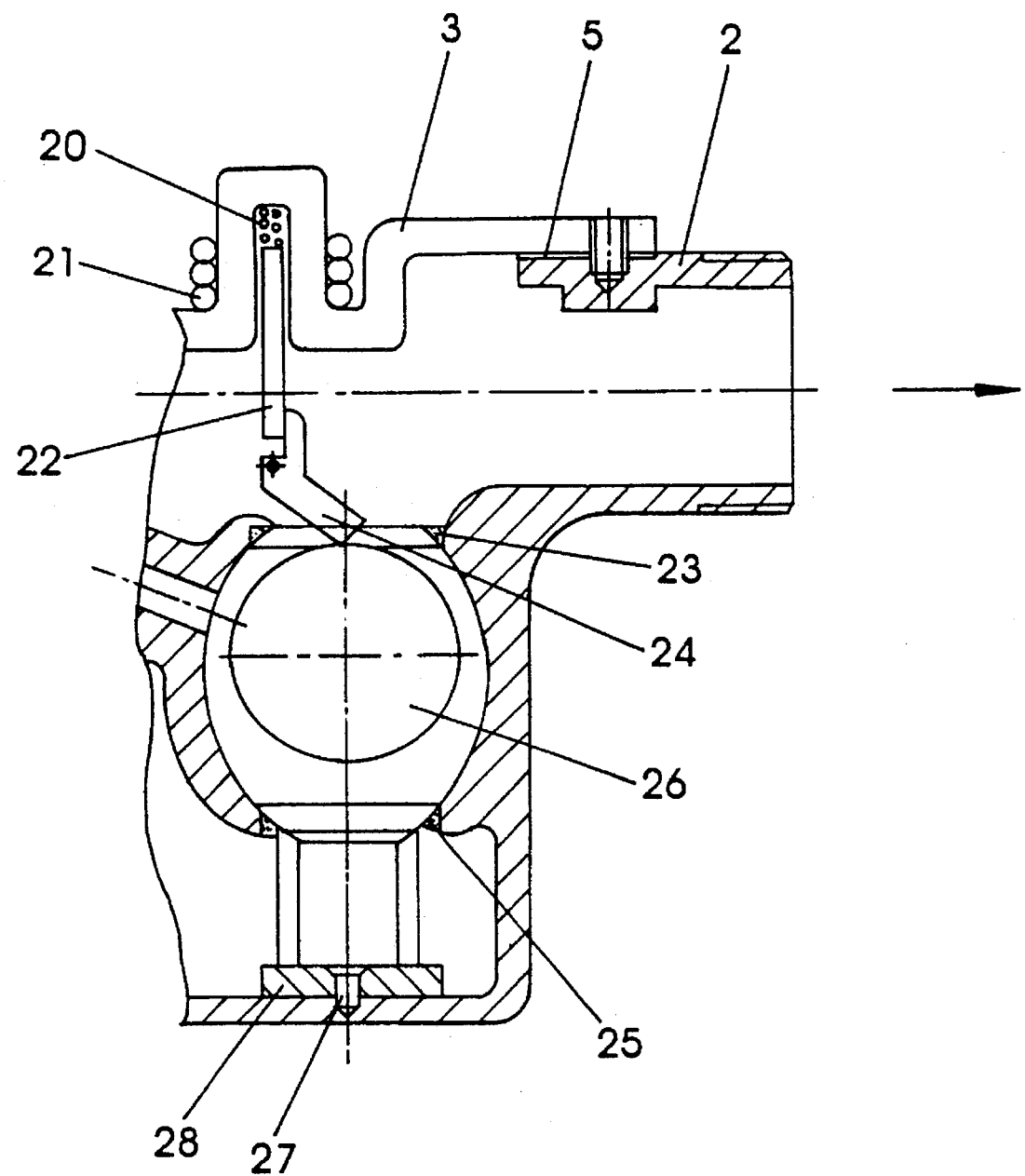
FIG. 3 shows the side cross-sectional view of the ball valve mechanism, showing the valve in the middle position pushing against the solenoid operating latch mechanism. The retractable piston is pushed out by the force of a spring. The fluid flow in this middle position is through the main and secondary ducts.

FIG. 3 illustrates the side cross-sectional view of the ball valve (26) when the flow is in its high range, the ball (26) is lifted from the lower seal (25), keeping the valve in the "normal open position". This will allow the fluid to flow around the ball and up through the open valve. The ball's motion is limited by a solenoid operated latch mechanism (22) and (24). The mechanism does not allow the ball to close the upper orifice (23) of the ball valve chamber.

Figure 4:
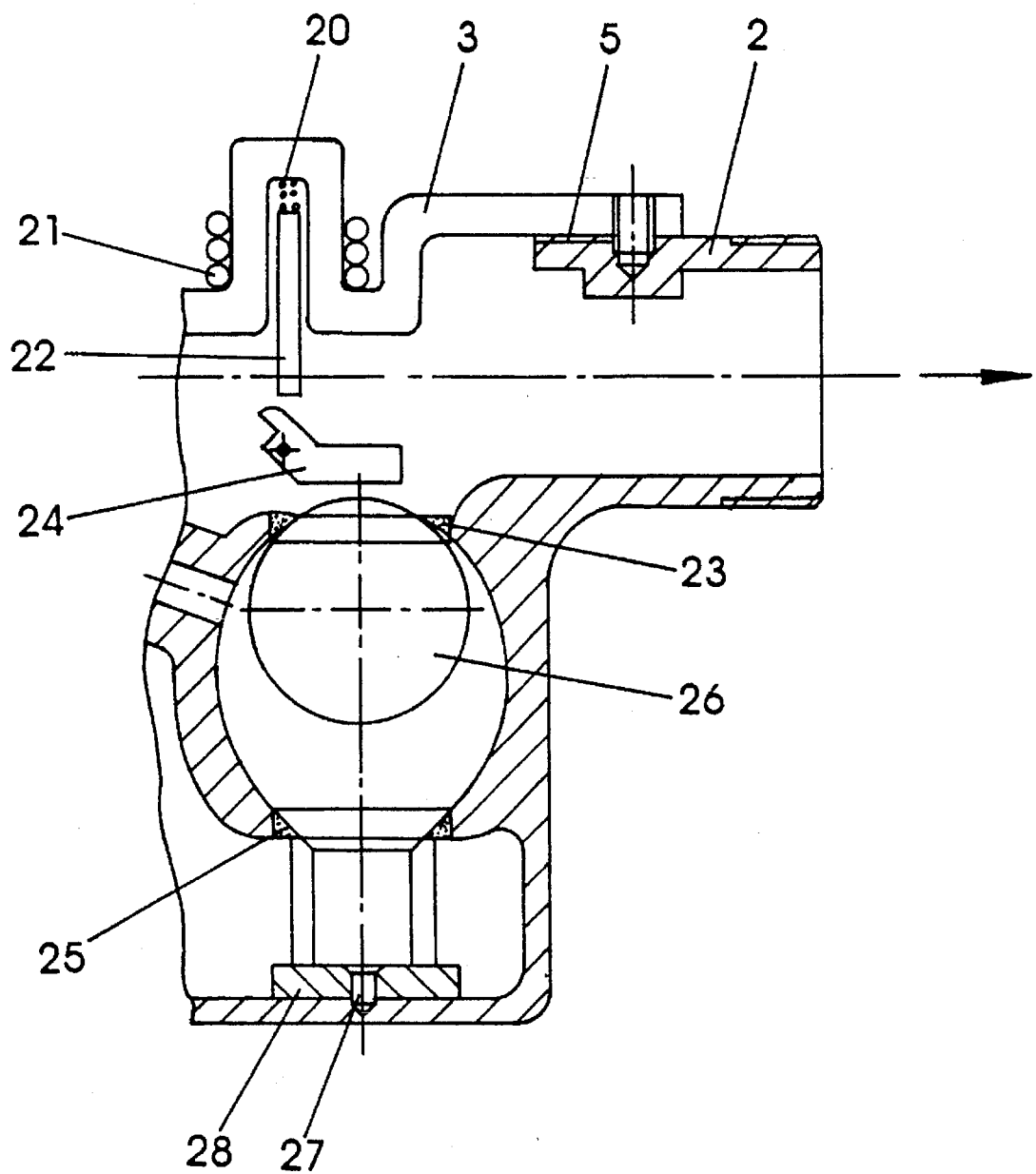
FIG. 4 shows the side cross-sectional view of the ball valve mechanism, showing the valve in the upper position pushing against the solenoid operating latch mechanism the retractable piston is pulled in by the solenoid pressing the spring. The latch is rotated allowing the ball to close at the valve's upper seal. The fluid flow in this situation is totally blocked.

FIG. 4 shows the side cross-sectional view of the ball valve chamber, showing the ball (26) seated on the upper seal (23). The solenoid (21) has pulled a retractable pin (22) against spring (20) allowing the latch (24) to rotate on its pivot, allowing the ball to close at the valve's upper seal. The fluid flow in this position is totally blocked.

Figure 5:
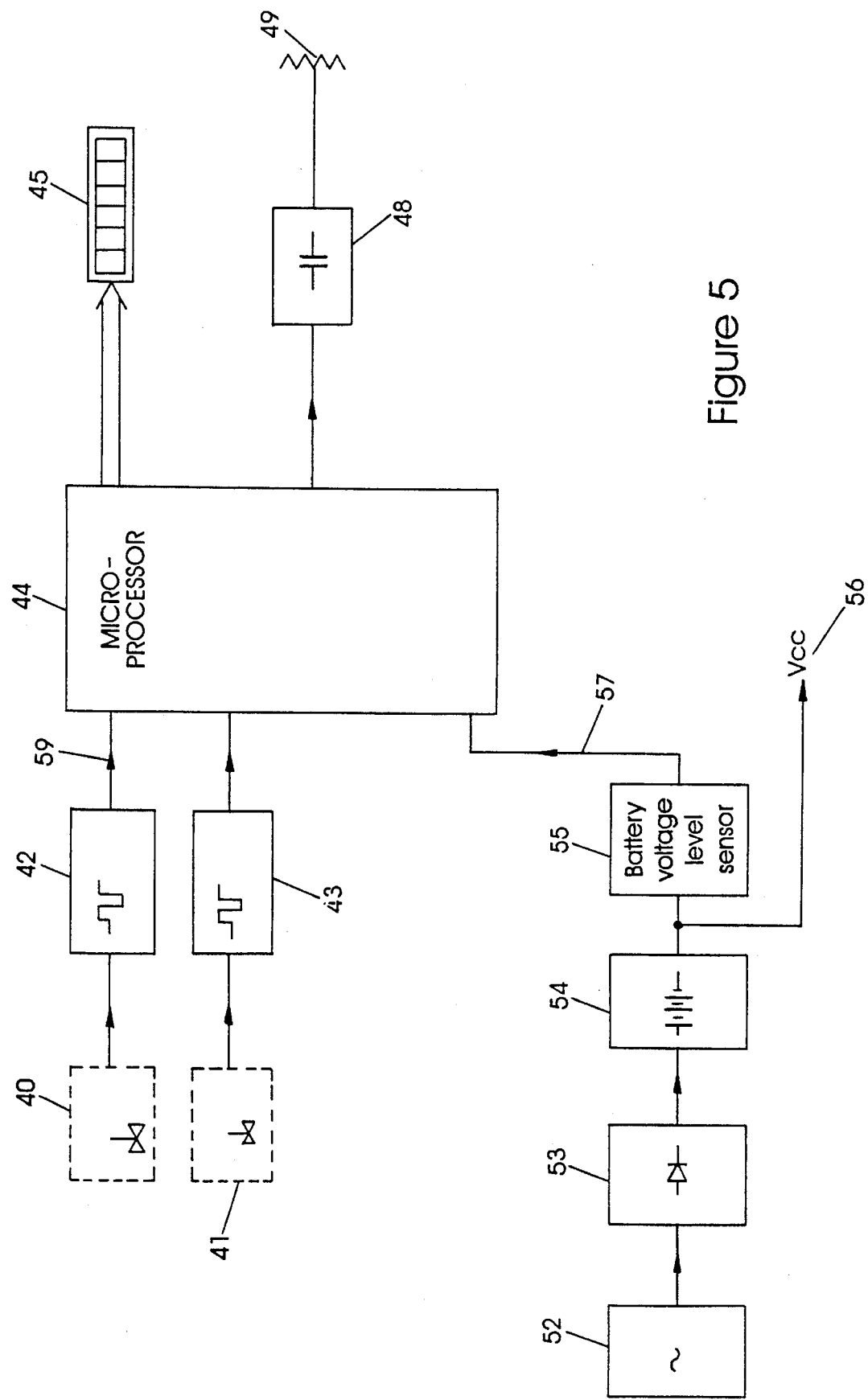
FIG. 5 shows the electronic hardware block diagram.

FIG. 5 shows the electronic hardware block diagram. Both the high flow meter (40) and the low flow meter (41) produce magnetic or optical or any other readable signal which may be picked up by the "flow to pulse rate converter" (42) or (43) respectively. Both (42) and (43) put out a logic level variable pulse stream (59) proportional to the fluid flow in the high flow meter (40) and the low flow meter (41) respectively. This pulse stream is compatible and is fed into the control inputs of the microprocessor (44) comprising CPU, program memory (fixed or downloadable), data memory, clock, input/output lines. The microprocessor (44) drives one or more low power displays (45). The microprocessor (44) will also control the solenoid valve (49).

The high current driver (48) will operate the solenoid valve (49) upon receiving a command from the microprocessor (44).

The high current driver (48) will contain an electrical capacitor storage which will be charged relatively slowly from a low power electric storage (54) when the high current driver receives a signal from the microprocessor (44) it will release a sudden voltage pulse (much in the same way as an electric photographic flash light) the signal from the microprocessor will only be sent when the liquid flow is above a minimum flow. We refer to FIG. 3. In this case the fluid is in its high range.

In this flow range the fluid will be exerting an upward pressure on the ball (26) which in turn will be exerting a similar force on the latch (24). At the moment the electric pulse is released, the solenoid rod (22) will retract against the force of the spring (20) allowing the upward force of the ball (26) to rotate the latch (24) about its pivot. The ball (26) will rise and seat on the seal (23) blocking all fluid flow.

Referring once again to FIG. 5 the microprocessor (44) will check if in fact all flow has stopped. If not the microprocessor (44) will give a repeat signal for a repeat trial.

As the meter is a self contained unit the energy source (52) could be one of the following:

1) external power, i.e. mains power supply
2) light operated solar cells
3) a dynamo or alternator or generator driven by the fluid flow in either the high or low fluid flow paths.

The charging regulator (53) transforms whatever power is supplied by the power source and converts the voltage to a level capable of charging the electric power storage (54) comprising rechargeable or other type of battery.

The battery is shaped to fit into the dry area of the meter such that it will be space efficient. The power storage (54) will supply the required voltage (56) to all electric circuits.

The battery voltage level sensor (55) will check the state of the electric power storage (54) and will send a signal on a two wire line (57) connected to the parallel input of the microprocessor (44). Lines (57) will give charged state of the power storage such as to the microprocessor indicating the state of the power storage (54) i.e., zero, low, med. and charged. This will allow the microprocessor to perform only crucial tasks (i.e fluid flow) when the electric power storage is in a poor state. This is the lower power operation and can be operated for a long period of time even with a power storage in a poor state.

Since the flow meter is electronic with a programmable microprocessor (44) this will facilitate further innovations.

Figure 6:
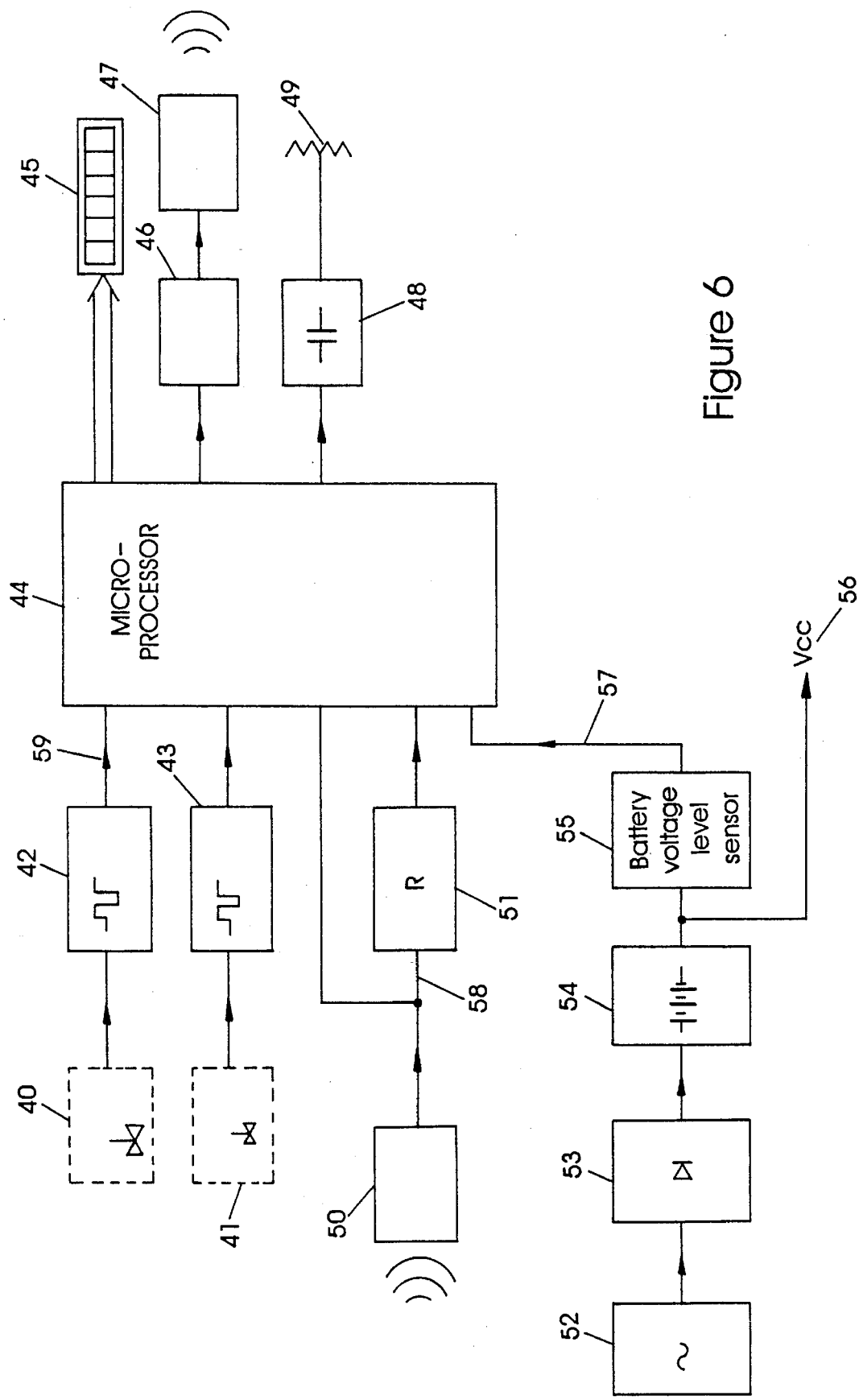
FIG. 6 shows the electronic hardware block diagram of a further innovation.

FIG. 6 shows an innovative method whereby information may be transferred between meters. The microprocessor (44) transfers information to the transmitter (46). The transmitter in turn transfers the information to the transmitter transducer (47). This transducer may be one of a number of types, i.e.:

i) hard wired modem;

ii) radio wave transmitter iii) sonic or ultrasonic transmitter transmitting sonic or ultrasonic waves which pass through the fluid in the piping system.

iv) or any other medium or transferring information.

Similarly information may be received by the receiver transducer (50). The receiver may be one of the following types:

i) hard wired modem ii) radio wave receiver iii) sonic or ultrasonic receiver (microphone) picking up sonic or ultrasonic waves which pass through the fluid piping system.

iv) any other medium of transferring information.

The receiver transducer with its required electronics (50) transfers a logic level variable pulse stream (58) to the receiver input of the microprocessor (44).

The reset command detector (51) upon receiving a remote signal from the transducer receiver (50) transfers signal into the reset port of the microprocessor (44).

Figure 7:
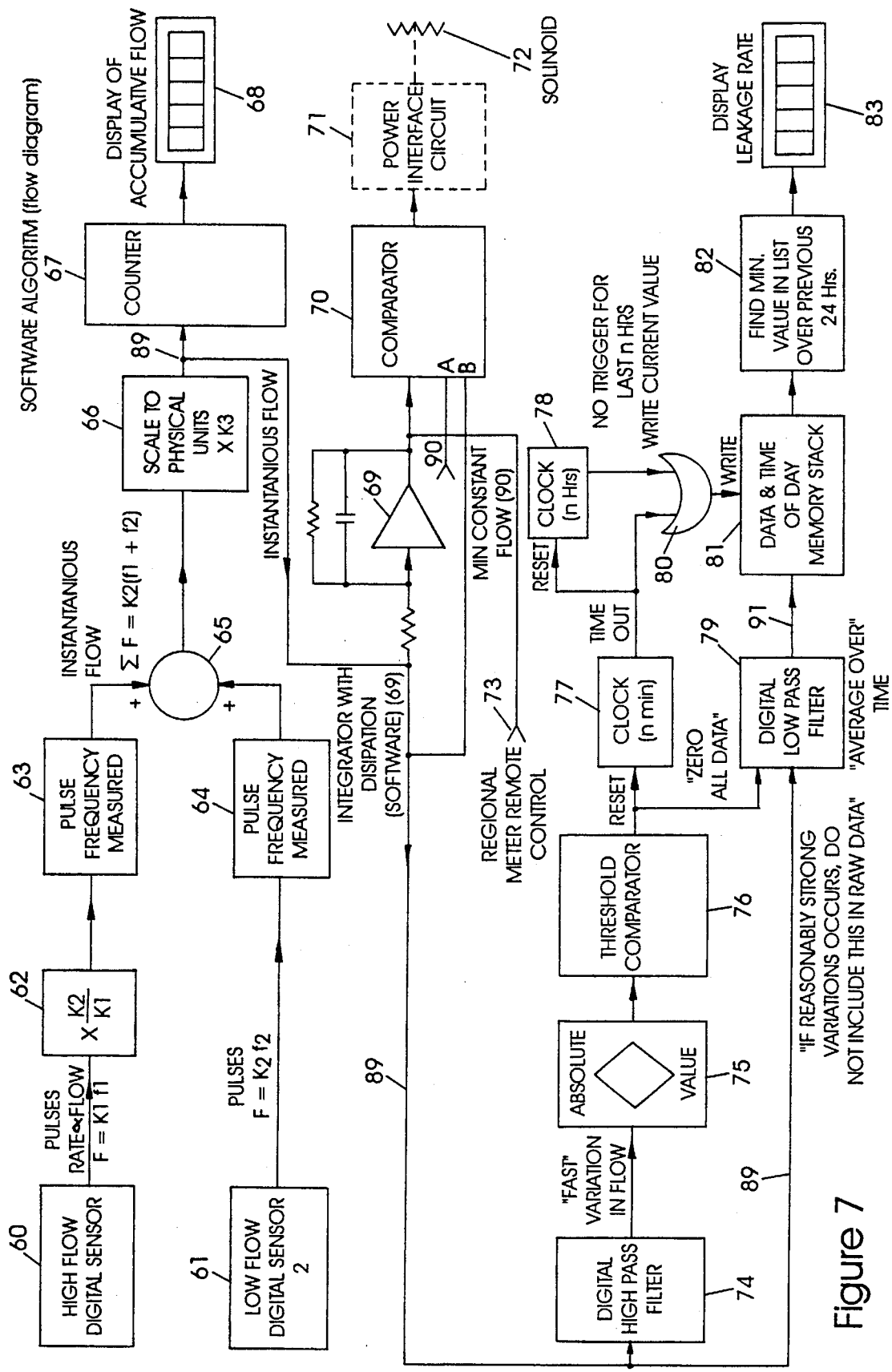
FIG. 7 shows the software alogaritm (flow diagram of the flow meter).

FIG. 7 shows the software alogarithm (flow diagram of the flowmeter).

The high flow digital sensor (60) generates pulses proportional to the rate of the fluid flow in the high flow meter.

The low flow digital sensor (61) generates pulses proportionally to the rate of fluid flow in the low flow meter. The multiplier (62) converts the high flow digital pulses to the same units as the low flow digital pulses.

The pulses frequency of the high flow meter is measured in (63) which converts the pulses into an instantaneous high flow signal.

Similarly the pulse frequency of the low flow meter is measured in (64) which converts the pulses into an instantaneous low flow signal.

Both the high flow and the low flow are accumulated in (65) which feeds a total flow into multiplier (66).

The multiplier (66) scales the sum of the high flowmeter and low flowmeter and produces an instantaneous flow in exact physical units (89). This instantaneous flow (89) is integrated in the counter (67) to give a accumulative fluid volume which is displayed on low power display (68).

The instantaneous flow (89) is fed into an integrator with dissipation (software) (69). The integrator with dissipation (69) automatically detects if the flow over a certain period of time is excessive and beyond a predetermined consumption graph. This can be compared to a water tank with a constant leakage.

As long as the amount of water flowing into the tank is equal to or less than the constant leakage out of the tank, then the tank will not fill up. However, when the flow into the tank is greater than the flow out of the tank, the water level in the tank will begin to rise. Eventually the water level will reach some critical level.

When the flow is excessive, i.e. beyond a predetermined consumption graph then the comparator (70) compares the instantaneous flow (89) with a min constant flow (90). The min flow (90) being the min flow capable of lifting the ball (26) shown in FIG. 4, to its upper seal (23).

The comparator (70) triggers the power interface circuit (71) which in turn actuate the solenoid (72). The comparator (70) can be operated manually or by remote control signal (73) to stop water flow. The comparator (70) will remember if it has received a "stop flow" command and trip the power interface circuit (71) only when the flow is greater than the minimum constant flow (90).

The instantaneous flow (89) will also feed into a digital high pass filter (74). This will react only to fast variations in the flow (i.e. when taps [valves] are switched on or off). (75) will take absolute value (i.e. no difference when tap [valve] opens or closes). The signal (indicating active water usage) will pass through a threshold comparator (76) which will only react to large variations in active fluid usage, i.e. (pulse indicating large variation in active fluid usage). This pulse resets a clock (77) which times a minimum of (n mnt) (i.e. each time the water is used the clock waits for a "quite" period of constant fluid usage then gives an output. If, however, no fluid is used for long periods of time) then clock (78) gives a pulse after (m hrs). Either clock (77) or clock (78) through "on" bridge (80) will indicate data to be written in memory stack (81).

The instantaneous flow (89) is fed into a digital low pass filer (79) this will average instantaneous flow (89) over time. This operates only during quite periods during constant fluid flow (i.e. when clock (77) is timing its n min). The average instantaneous flow (91) is registered in a data and time of day memory stack (81) this value is written into memory after a "quiet period" of either n min (77) or m hrs (78), (82) finds the minimum value in list of written values of average instantaneous flow over the previous 24 hrs. This value indicates the leakage rate which is displayed on leakage rate display (83).

I claim:

1. A liquid flow measuring system comprising a power source; a main flow meter and a secondary low flow meter located in a by-pass pipe to said main flow meter; a three position valve connected to both said main and secondary meters, said three position valve having a flow path adjuster moveable between a first position, a second position, and a third position to establish a selected flow path through the valve, and a latch mechanism permitting or preventing movement of the flow path adjuster into the third position, wherein the first position of said flow path adjuster substantially prevents liquid flow to said main flow meter at a predetermined low flow rate and permits operation of only said secondary flow meter, wherein the second position of said flow path adjuster enables, at a predetermined normal flow rate, liquid to flow through both flow meters, and wherein the third position of said flow path adjuster enables blockage of substantially all fluid flow through both flow meters at a predetermined high flow rate; and a microprocessor responsive to signals representative of flow meter data, for controlling flow measurements by operating the three position valve and said latch mechanism.

2. A system according to claim 1 wherein the three position valve is a ball valve.

3. A system according to claim 1 wherein the ball is held in the closed position by a magnet.

4. A system according to claim 1 wherein the latch mechanism is solenoid operated to allow the valve to reach its third position.

5. A system according to claim 4 wherein the solenoid is operated by an external or remote control mechanism.

6. A system according to claim 1 wherein the power source is selected from external power; light operated solar cells; or dynamo, alternator or generator driven by the fluid flow in either the high or low fluid flow paths.

7. A system according to claim 1 wherein each flow meter has a separate electronic counter and the flow detected by the flowmeters are summed by the microprocessor, and wherein said microprocessor registers and alerts when a continuous low flow exists.

8. A system according to claim 7 wherein the latch mechanism is solenoid operated allowing the flow path adjuster to reach its third position, and wherein the microprocessor automatically detects predetermined high flow rates and activates the solenoid-operated latch mechanism to allow the flow rate adjuster to reach its third position and block fluid flow.

9. A system according to claim 8 wherein the microprocessor compares the fluid flows in both the main flow meter and the secondary flow meter and alerts of a malfunction in the accuracy of the meter readings when there is a predetermined discrepancy between the flows measured by the main and secondary meters.

10. A system according to claim 1, wherein said system is connected to at least one of a sonic, ultrasonic, and longitudinal mechanical wave transmitter/receiver system.

11. A system according to claim 1 wherein a magnet fixes the flow path adjuster in the first position.

12. A system according to claim 1 wherein the flow path adjuster of the valve can be cylindrical elliptical bullet shaped or "T" shaped.

\* \* \* \* \*